(12) United States Patent
Ehleskog et al.

(10) Patent No.: US 11,698,010 B2
(45) Date of Patent: Jul. 11, 2023

(54) INTERNAL COMBUSTION ENGINE SYSTEM AND A METHOD OF OPERATING AN INTERNAL COMBUSTION SYSTEM

(71) Applicant: VOLVO TRUCK CORPORATION, Gothenburg (SE)

(72) Inventors: Malin Ehleskog, Hisings Backa (SE); Lennart Andersson, Skällinge (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/601,071

(22) PCT Filed: Mar. 27, 2020

(86) PCT No.: PCT/EP2020/058704
§ 371 (c)(1),
(2) Date: Oct. 3, 2021

(87) PCT Pub. No.: WO2020/201082
PCT Pub. Date: Oct. 8, 2020

(65) Prior Publication Data
US 2022/0170398 A1 Jun. 2, 2022

(30) Foreign Application Priority Data
Apr. 4, 2019 (WO) ............. PCT/EP2019/058462

(51) Int. Cl.
*F01N 3/10* (2006.01)
*F02M 26/05* (2016.01)
(Continued)

(52) U.S. Cl.
CPC ............ *F01N 3/103* (2013.01); *F02D 9/04* (2013.01); *F02D 41/0055* (2013.01);
(Continued)

(58) Field of Classification Search
CPC ...... F01N 3/103; F01N 2430/085; F02D 9/04; F02D 41/0055; F02D 41/0082;
(Continued)

(56) References Cited

U.S. PATENT DOCUMENTS 6,484,702 B1  11/2002  Riley
9,518,486 B2  12/2016  Koch et al.
(Continued)

FOREIGN PATENT DOCUMENTS

DE   102005018221 A1   10/2006
DE   102016006676 A1   1/2017
(Continued)

OTHER PUBLICATIONS

International Search Report and Written Opinion of the International Searching Authority, PCT/EP2020/058704, dated Apr. 23, 2020, 16 pages.
(Continued)

*Primary Examiner* — Audrey B. Walter
(74) *Attorney, Agent, or Firm* — Sage Patent Group (57) ABSTRACT

Provided are a method and an ICE system, including an internal combustion engine including a first and a second set of cylinders. A first and a second EGR valve control flow of exhaust gas from the cylinders to an EGR conduit. A controller controls the closing of the second EGR valve, thereby preventing flow of exhaust gas from the second set of cylinders to the EGR conduit. The second EGR valve is upstream of a turbine. The controller is configured to activate a fuel injector for late post injection of fuel into the second set of cylinders when the second EGR valve is closed, so that at least a part of the fuel that exits the second set of cylinders is uncombusted. An exhaust gas aftertreat-
(Continued)

ment system receives and treats exhaust gas which is not recirculated in the EGR conduit, and includes an oxidation catalyst for combustion.

19 Claims, 7 Drawing Sheets

(51) Int. Cl.
| | | |
|---|---|---|
| *F02M 26/16* | (2016.01) | |
| *F02M 26/34* | (2016.01) | |
| *F02M 26/38* | (2016.01) | |
| *F02M 26/42* | (2016.01) | |
| *F02D 9/04* | (2006.01) | |
| *F02D 41/00* | (2006.01) | |
| *F02D 41/02* | (2006.01) | |
| *F02D 41/40* | (2006.01) | |

(52) U.S. Cl.
CPC ....... *F02D 41/0082* (2013.01); *F02D 41/025* (2013.01); *F02D 41/405* (2013.01); *F02M 26/05* (2016.02); *F02M 26/16* (2016.02); *F02M 26/34* (2016.02); *F02M 26/38* (2016.02); *F02M 26/42* (2016.02); *F01N 2430/085* (2013.01)

(58) Field of Classification Search
CPC ..... F02D 41/025; F02D 41/405; F02M 26/05; F02M 26/16; F02M 26/34; F02M 26/38; F02M 26/42
See application file for complete search history.

(56) References Cited

U.S. PATENT DOCUMENTS

| | | | |
|---|---|---|---|
| 2005/0241299 A1 | 11/2005 | Brown | |
| 2007/0028901 A1* | 2/2007 | Watakabe | F02M 26/23 123/568.2 |
| 2009/0158710 A1* | 6/2009 | Suzuki | F02D 41/1462 60/285 |
| 2010/0263623 A1* | 10/2010 | Sakurai | F02M 25/03 123/25 J |
| 2011/0023829 A1* | 2/2011 | Miyashita | F02D 41/0087 123/445 |
| 2011/0289914 A1 | 12/2011 | Afjeh | |
| 2013/0000614 A1* | 1/2013 | Freund | F02M 26/38 123/568.2 |
| 2016/0146136 A1* | 5/2016 | Surnilla | F02D 15/00 123/481 |

FOREIGN PATENT DOCUMENTS

| | | |
|---|---|---|
| JP | 2004150341 | 5/2004 |
| WO | WO 2004/057168 A1 | 7/2004 |
| WO | WO 2018/113930 A1 | 6/2018 |

OTHER PUBLICATIONS

International Preliminary Report on Patentability, PCT/EP2020/058704, dated Feb. 12, 2021, 10 pages.
International Search Report and Written Opinion of the International Searching Authority, PCT/EP2019/058462, dated Nov. 22, 2019, 16 pages.

* cited by examiner

INTERNAL COMBUSTION ENGINE SYSTEM AND A METHOD OF OPERATING AN INTERNAL COMBUSTION SYSTEM

CROSS REFERENCE TO RELATED APPLICATIONS

This application is a 35 U.S.C. § 371 national stage application of PCT International Application No. PCT/EP2020/058704 filed on Mar. 27, 2020, which in turns claims priority to International Application No. PCT/EP2019/058462, filed on Apr. 4, 2019, the disclosures and content of which are incorporated by reference herein in their entirety.

TECHNICAL FIELD

The invention relates to an internal combustion engine system and to a vehicle comprising such a system. The invention also relates to a method of controlling an internal combustion engine system, a computer program, a computer readable medium and a control unit.

The invention can be applied in heavy-duty vehicles, such as trucks, buses and construction equipment. Although the invention will be described with respect to a truck, the invention is not restricted to this particular vehicle, but may also be used in other vehicles such as cars.

BACKGROUND

Most trucks today are powered by internal combustion engines having cylinders in which fuel is combusted whereby exhaust gases are generated. The exhaust gases are normally transferred to an exhaust gas aftertreatment system (EATS) where the exhaust gases are treated and at least some of the pollutants in the exhaust gases are converted into harmless substances. The EATS may comprise an oxidation catalyst suitable for converting hydrocarbons and carbon monoxide to carbon dioxide and water, a particulate filter catching soot and ashes, and a reduction catalysts reducing nitrogen oxides to nitrogen, sometimes with the help of a reductant fluid. During cold start or low exhaust temperature it is desirable to heat the EATS to its working temperature, and occasionally it is desirable to heat the EATS to a higher temperature than the normal exhaust temperature. Such events could be to burn off collected soot, poisonous matter, e.g. sulphur, collected on the catalysts, or deposits created by the reductant. These elevated temperatures can be reached by adding fuel to the oxidation catalyst. For instance, the exhaust gas may be enriched by uncombusted or partially combusted fuel, by means of late post injection in the engine. The hydrocarbons of the injected fuel are burnt on the catalyst, thereby increasing the temperature.

In order to maintain a low NOx formation, internal combustion engines may be fluidly connected to exhaust gas recirculation (EGR) conduits for recirculation of some of the exhaust gas. The recirculated exhaust gas dilutes the air/fuel mixture just enough to reduce combustion temperatures to a level that reduces the reaction between nitrogen and oxygen that forms NOx.

While these two methods, i.e. late post injection and EGR, are each advantageous for their particular purpose, combining the two, however, may result in problems. A problem that may arise is that the high concentration of hydrocarbons obtained from the late post injection may negatively affect the EGR. More particularly, an EGR conduit is normally provided with an EGR cooler. The high concentration of hydrocarbons may affect the EGR cooler negatively by condensing on the cold heat exchanger surface, which will reduce the cooling performance of the cooler and as a consequence reduce the efficiency of the engine. Further the high hydrocarbon concentration in the EGR and hence in the intake air will affect the combustion in the cylinders negatively, burning off early in the compression stroke.

U.S. Pat. No. 9,518,486 discloses a method for operating an internal combustion engine having two first cylinders and two second cylinders. EGR gases are only taken from the first cylinders and an EGR valve controls the quantity of the exhaust gas recirculated to the air tract of the internal combustion engine. The temperature of the exhaust gases from the internal combustion engine is increased by post-injecting fuel, the fuel being oxidized by a catalytic converter. Post-injection takes place only in the second cylinders, the exhaust gases of which are not recirculated.

Although the method of U.S. Pat. No. 9,518,486 reduces the risk of the uncombusted hydrocarbons entering the EGR by only recirculating form the first cylinders and only post-injecting in the second cylinders, it would be desirable to provide a more flexible internal combustion engine system, without these limitations.

SUMMARY

An object of the invention is to provide an internal combustion engine system, which alleviates the above mentioned drawbacks of the prior art.

According to a first aspect, the object is achieved by an internal combustion engine according to claim 1. The internal combustion engine system comprises an internal combustion engine comprising a first set of one or more cylinders and a second set of one or more cylinders which is separate from the first set, an exhaust gas recirculation (EGR) conduit for recirculating exhaust gas from the first and second sets of cylinders to an inlet of the internal combustion engine, a first EGR valve for controlling flow of exhaust gas from the first set of cylinders to the EGR conduit, and a fuel injector for injection of fuel into at least one cylinder of the second set of cylinders, wherein the system further comprises a second EGR valve for controlling flow of exhaust gas from the second set of cylinders to the EGR conduit, a controller configured to control the closing of the second EGR valve, thereby preventing flow of exhaust gas from the second set of cylinders to the EGR conduit, and configured to activate the fuel injector for late post injection of fuel into at least one cylinder of the second set of cylinders when the second EGR valve is closed, so that at least a part of the fuel that exits the second set of cylinders is uncombusted, a turbine arranged to receive and be driven by exhaust gas which is not recirculated in the EGR conduit, and an exhaust gas aftertreatment system (EATS) arranged to receive and treat exhaust gas which is not recirculated in the EGR conduit, the exhaust gas aftertreatment system comprising an oxidation catalyst for combustion of the late post injected fuel or derivates thereof, wherein, for the exhaust gas flowing from the second set of cylinders, the second EGR valve is located upstream of the turbine.

The invention is based on the realization that by providing two EGR valves, in a normal operating mode, exhaust gas from both sets of cylinders may be recirculated, while in a temperature-increasing operating mode, one of the EGR valves may be closed so as to only allow recirculation from one set of cylinders, and late post injecting fuel in the other set of cylinders. This allows increased flexibility and more options for controlling the handling of exhaust gases from the first and second set of cylinders. Furthermore, an advantage of having two EGR valves, i.e. allowing recirculation of exhaust gases from both sets of cylinders in a normal operating mode, is that an equal amount of exhaust gas can be recirculated from both sets of cylinders, thereby avoiding imbalance and achieving higher efficiency.

It should be understood that in this application, a "set" can include any number of items, i.e. it can be a single item or it can be plural items. Accordingly, a set may include one or more cylinders in an internal combustion engine. The term "set" is thus used to distinguish one or more cylinders from one or more other cylinders. This is reflected in claim 1 which discloses a first set of one or more cylinders and a second set of one or more cylinders which is separate from the first set. Furthermore, it should be understood that, for simplicity and ease of reading, in this application reference will be made to the "first set of cylinders" and to the "second set of cylinders", instead of the first "set of one or more cylinders" and the "second set of one or more cylinders". Thus, it should be understood that as far as the term a "set of cylinders" is concerned, the number of cylinders in each set may for example be one, two, three, four or more.

It should be understood that in this application "late post injection" of fuel means that fuel is injected after a main injection in such way that the later injected fuel remains uncombusted or at least partly uncombusted when exiting the cylinder. The late post injection may, for instance, occur before (such as right before) an exhaust valve opens so that uncombusted fuel may pass to the EATS.

It should be understood that various types of fuels may be used in connection with the present invention. For instance, the fuel may be diesel (hydrocarbons), alcohols (such as ethanol), methane, ethers (such as dimethyl ether). It should also be understood that any hydrocarbons may be partially oxidized (for instance, because the fuel was provided in such state or because the hydrocarbons have oxidized in the cylinders).

It should also be understood that in this application a "controller" may include any suitable electrical, mechanical, magnetic, pneumatic and/or hydraulic, etc. means for controlling the different components (such as the EGR valves and the fuel injector) of the system, in particular for controlling how, when and/or for how long the components should be activated/inactivated. The controller may include a non-transitory computer-readable storage medium storing one or more programs configured to be executed by one or more processors of the system, the one or more programs comprising instructions for performing the steps defined in the claims.

In the internal combustion engine system, the turbine may suitably be connected to a compressor for compressing intake air. The turbine is driven by the exhaust gas that flows to the EATS. The EATS is suitably located downstream of the turbine. Furthermore, both the first and the second EGR valves may suitably located upstream of the turbine. Thus, exhaust gas from the first and second sets of cylinders may suitably be recirculated upstream of the turbine.

In the internal combustion engine system, there may suitably be provided an EGR cooler in the EGR conduit for cooling recirculated exhaust gas.

According to at least one exemplary embodiment, the controller is configured to determine a desired EGR flow and to control the opening of the first EGR valve so that the desired EGR flow is recirculated from the first set of cylinders to the inlet of the internal combustion engine. This has the advantage that, in a temperature-increasing operating mode, while the second EGR valve is closed for enabling late post injection in the second set of cylinders, the first EGR valve may be opened to a desired degree for recirculating the exhaust gas from the first set of cylinders for reducing NOx formation.

According to at least one exemplary embodiment, the flow of recirculated exhaust gas delivered from the EGR conduit to said inlet continues to flow from said inlet to both the first and second sets of cylinders. This is beneficial since an improved balance in the system is obtained, in relation to what may be the case if exhaust gas is only recirculated to one of the first and second sets of cylinders.

According to at least one exemplary embodiment, the controller is configured to control the first and second EGR valves so that a desired ratio of recirculated flow of exhaust gas to the EGR conduit relative to the amount of air entering the inlet of the internal combustion engine is obtained. This has the advantage that the air-to-fuel ratio, or more specifically the oxygen-to-fuel ratio may be controlled to a desired level to meet performance and emission objectives. In a normal operating mode, both the first and the second EGR valve may be controlled so that a suitable amount of exhaust gas is recirculated and so that a desired oxygen-to-fuel ratio is obtained. In a temperature-increasing operating mode, the opening degree of the first EGR valve may be appropriately controlled to obtain the desired ratio. For instance, if in the normal operating mode both the first and the second EGR valve had a similar opening degree, in the temperature-increasing operating mode, the closing of the second EGR valve may be compensated by increasing the opening degree of the first EGR valve so as to maintain the flow of exhaust gas to the EGR conduit at a desired level.

According to at least one exemplary embodiment, when the second EGR valve is closed all exhaust gas from the second set of cylinders flows to the exhaust gas aftertreatment system. Hereby, even though late post injection is performed in the second set of cylinders, the risk of uncombusted hydrocarbons entering the EGR conduit is avoided.

According to at least one exemplary embodiment, the second EGR valve is additionally configured to control flow of exhaust gas from the first set of cylinders to the EGR conduit. By this arrangement, other control possibilities are achieved. In particular, in combination with an EGR cooler advantages may be obtained. For instance, according to at least one exemplary embodiment, the internal combustion engine system comprises an EGR cooler provided in the EGR conduit, wherein the first EGR valve is fluidly connected to the EGR conduit downstream of the EGR cooler. This may be advantageous at cold start conditions, since some of the recirculated gas may bypass the EGR cooler. Thereby, it is possible to control the amount of recirculated gases that should not be cooled. The non-cooled gas provides hotter inlet gas to the cylinders, which in turn results in hotter exhaust gas at cold start. Suitably, if there is provided a second EGR valve configured to control flow of exhaust gas from both sets of cylinders (as exemplified above), then the exhaust gases passing through the second EGR valve are suitably led through the EGR cooler for appropriate cooling. Thus, the amount of cooled versus non-cooled recirculated gases may be efficiently controlled when late post injection is not performed.

According to at least one exemplary embodiment, the oxidation catalyst is an electrically heated oxidation catalyst. This is advantageous since, by heating the catalyst, a good conversion efficiency may be obtained even though the exhaust gas is not at a temperature that would otherwise be considered a high enough temperature. An electric heater may be provided in front of the catalyst to heat the catalytic substrate, or the catalytic substrate may form part of the electric heater as such.

According to at least one exemplary embodiment, the controller is configured to heat the oxidation catalyst to the light-off temperature for hydrocarbons present in the injected fuel. Due to cracking of the fuel, e.g. diesel, by the late post injection and the electrical heating, the exhaust gas does not need to be at a temperature suitable for fuel vaporisation and light-off.

According to at least one exemplary embodiment, the internal combustion engine system comprises an exhaust throttle, wherein the exhaust throttle is provided downstream of the turbine, or the exhaust throttle is provided in an exhaust conduit downstream of the first and second EGR valves and upstream of the turbine, wherein the controller is configured to control the exhaust throttle for further controlling the flow to the EGR conduit. By the provision of an exhaust throttle, an additional controlling component is available for controlling the flow to the EGR conduit. Furthermore, the obstruction of flow of exhaust gas increases the temperature of the exhaust gas.

According to at least one exemplary embodiment, the internal combustion engine system comprises a compressor or pump fluidly connected to the EGR conduit, wherein the controller is configured to control the compressor or pump for controlling the flow in the EGR conduit. Thus, the flow in the EGR conduit may be boosted by providing an additional flow control component in the form of a compressor or pump which may drive the EGR flow when the pressure at the intake is higher than the pressure at the exhaust manifold to the EGR conduit.

According to a second aspect of the invention, the object is achieved by a vehicle comprising an internal combustion engine system according to the first aspect. The vehicle may, for instance, be a truck, a bus, construction equipment or a car.

According to a third aspect of the invention, the object is achieved by a method of operating an internal combustion engine system which comprises an internal combustion engine comprising a first set of one or more cylinders and a second set of one or more cylinders which is separate from the first set, an exhaust gas recirculation (EGR) conduit for recirculating exhaust gas from the first and second sets of cylinders to an inlet of the internal combustion engine, a first EGR valve for controlling flow of exhaust gas from the first set of cylinders to the EGR conduit, a second EGR valve for controlling flow of exhaust gas from the second set of cylinders to the EGR conduit, a fuel injector for injection of fuel into at least one cylinder of the second set of cylinders, a turbine arranged to receive and be driven by exhaust gas which is not recirculated in the EGR conduit, and an exhaust gas aftertreatment system arranged to receive and treat exhaust gas which is not recirculated in the EGR conduit, the exhaust gas aftertreatment system comprising an oxidation catalyst for combustion of fuel and/or fuel derivates, wherein, for the exhaust gas flowing from the second set of cylinders, the second EGR valve is located upstream of the turbine, the method comprising the steps of:

closing the second EGR valve, thereby preventing flow of exhaust gas from the second set of cylinders to the EGR conduit, activating the fuel injector for late post injection of fuel into at least one cylinder of the second set of cylinders when the second EGR valve is closed, so that at least a part of the fuel that exits the second set of cylinders is uncombusted.

It should be understood that the control unit of the system of the first aspect of the invention is configured to perform the steps and include the features of any one of the embodiments of the method according to the third aspect of the invention.

According to at least one exemplary embodiment, the method of the third aspect, comprises the further steps of:

determining a desired EGR flow, and controlling the opening of the first EGR valve so that the desired EGR flow is recirculated from the first set of cylinders to the inlet of the internal combustion engine.

The step of controlling the opening of the first EGR valve may be performed before, during or after closing the second EGR valve.

The advantages of the various embodiments of the third aspect are largely analogous to the advantages of the corresponding embodiments of the first aspect, and for the sake of brevity, all will not be repeated here. Exemplary embodiments of the method of the third aspect are defined in claims 14-18.

According to a fourth aspect of the invention, the object is achieved by means of a computer program comprising program code means for performing the steps of the method according to the third aspect and any embodiments thereof, when said program is run on a computer.

According to a fifth aspect of the invention, the object is achieved by a computer readable medium comprising a computer program comprising program code means for performing the steps of the method according to the third aspect and any embodiments thereof, when said program is run on a computer.

According to a sixth aspect of the invention, the object is achieved by a control unit for controlling the exhaust temperature in an internal combustion engine, the control unit being configured to perform the steps of the method according to the third aspect and any embodiments thereof. The control unit may suitably be, or be included in, or comprise, the controller of the system according to the first aspect.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
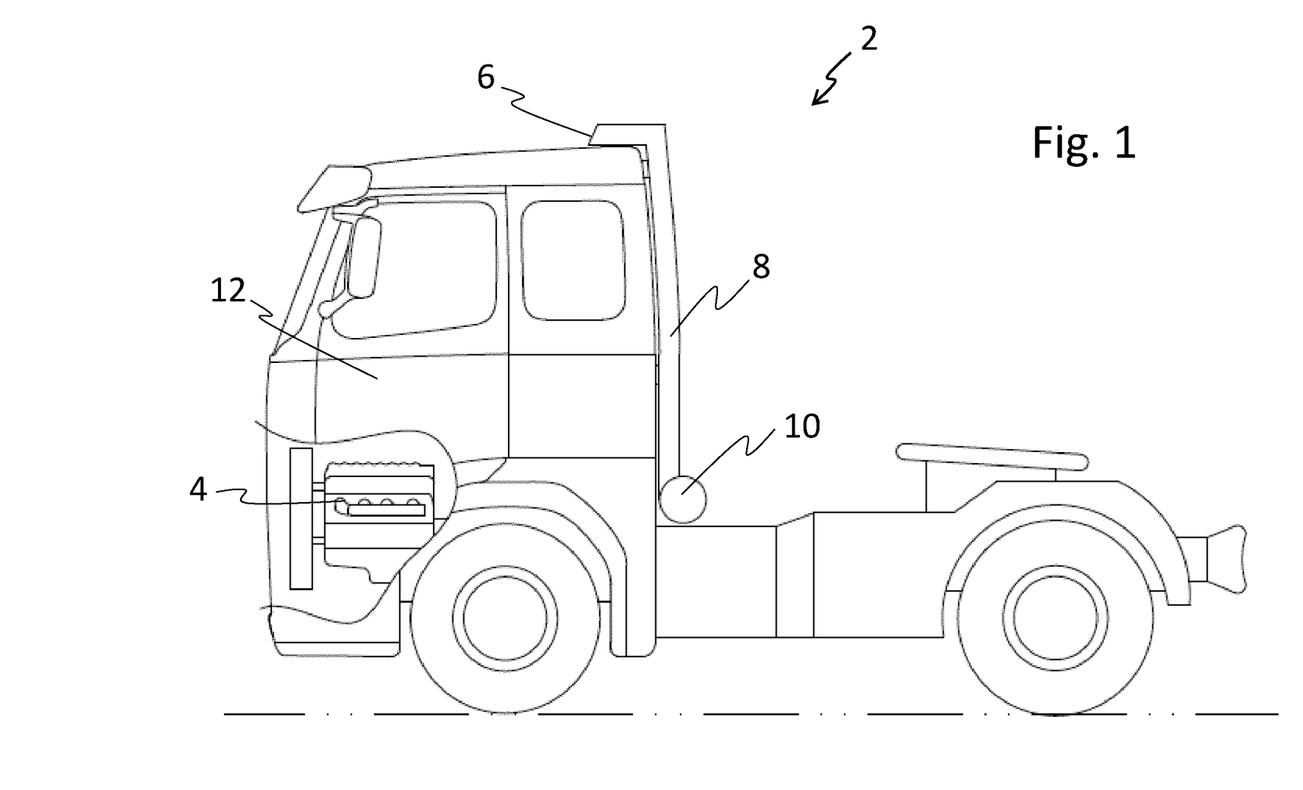
FIG. 1 is a schematic view illustrating a vehicle comprising an internal combustion engine system in accordance with at least some exemplary embodiments of the invention.

FIG. 1 is a schematic view illustrating a vehicle 2 comprising an internal combustion engine system in accordance with at least one exemplary embodiment of the invention. In this example, the vehicle 2 is illustrated in the form of a truck, powered by an internal combustion engine 4. However, the present invention may well be implemented also in other types of vehicles powered by an internal combustion engine, such as busses, construction equipment and passenger cars.

The vehicle 2 is illustrated as being provided with an air intake arrangement comprising an air intake 6 in which air enters and moves vertically down an air duct 8. The air flows to an air cleaner 10 and then to an internal combustion engine system which comprises the internal combustion engine 4. In the depicted embodiment the air cleaner 10 is located in a lower region of the vehicle 2 and the air intake 6 is located in a higher region of the vehicle 2, more specifically the air cleaner 10 is located directly behind a vehicle cab 12, whereas the air intake 6 is located on top of the cab 12. It should, however, be noted that the locations of the parts detailed above may well be otherwise, as long as air is fed to the internal combustion engine system.

Figure 2:
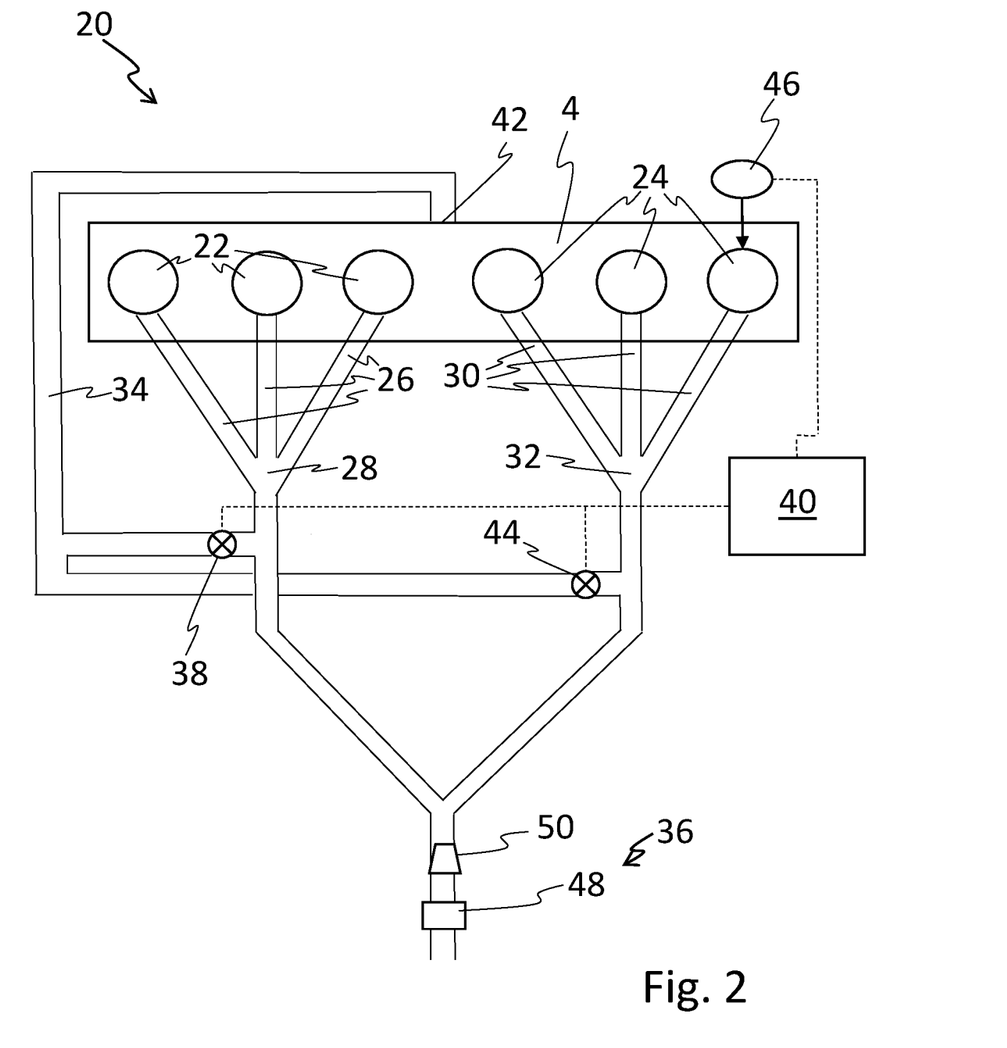
FIG. 2 is a schematic view illustrating an internal combustion engine system in accordance with at least some exemplary embodiments of the invention.

FIG. 2 is a schematic view illustrating an internal combustion engine system 20 in accordance with at least some exemplary embodiments of the invention. The system 20 comprises an internal combustion engine 4, which in turn comprises a first set of cylinders 22 and a second set of cylinders 24, the second set of cylinders 24 being separate from the first set of cylinders 22. In this schematic representation of the internal combustion engine 4 each one of the first and second sets has three cylinders. However, it should be understood that the number of cylinders in each one of the first and second sets could be fewer or more. For instance, a set may have one, two, four or more cylinders.

Each cylinder has an outlet connected to a respective exhaust duct. The three exhaust ducts 26 from the first set of cylinders 22 are joined at a first junction 28, and the three exhaust ducts 30 from the second set of cylinders 24 are joined at a second junction 32. From the first junction 28, the exhaust gas is allowed to flow either to an exhaust gas recirculation (EGR) conduit 34 for recirculating the exhaust gas, or to an exhaust gas aftertreatment system (EATS) 36.

The internal combustion engine system 20 comprises a turbine 50 connected to a compressor (not illustrated) for compressing intake air. The turbine 50 is driven by the exhaust gas that flows to the EATS 36. In the illustrated exemplary embodiment, the turbine 50 is located upstream of the EATS 36. In some exemplary embodiments, the exhaust gas from the first set of cylinders 22 and the exhaust gas from the second set of cylinders 24 may have separate inflows to the turbine 50. In other exemplary embodiments, the exhaust gas from the first and second set of cylinders 22, 24, may, as illustrated in FIG. 2 have one common inflow to the turbine 50.

A first EGR valve 38 is provided for controlling the flow of exhaust gas from the first set of cylinders 22 to the EGR conduit 34. Thus, when the first EGR valve 38 is closed, all or substantially all the exhaust gas from the first set of cylinders 22 will pass to the EATS 36 via the turbine 50. By setting the opening degree of the first EGR valve 38, the amount of exhaust gas recirculated via the EGR conduit 34 can be regulated. The first EGR valve 38 may be an electric EGR valve or a mechanical (e.g. pneumatic or hydraulic) EGR valve. For instance, the first EGR valve 38 may comprise a computer-controllable stepper motor to open and close the EGR valve or a computer-controllable solenoid vacuum valve, or the like.

The system 20 comprises a controller 40 which is configured to determine a desired EGR flow and to control the opening of the first EGR valve 38 so that the desired EGR flow is recirculated from the first set of cylinders 22 to the inlet 42 of the internal combustion engine 4. The controller 40 may, for instance, be any suitable type of computer or microcomputer having one or more processors. The controller 40 may include a non-transitory computer-readable storage medium storing one or more programs configured to be executed by one or more processors of the system 20, the one or more programs comprising instructions for controlling the opening and closing of the first EGR valve 38.

Similarly, the exhaust gas from the second junction 32 may be led to the EATS 36 and/or to the EGR conduit 34. Thus, there is provided a second EGR valve 44, which is controllable by the controller 40 to either close the second EGR valve 44, in which case substantially all exhaust gas passes to the EATS 36 via the turbine 50 or to open the second EGR valve 44 to bleed off exhaust gas for recirculation to the inlet 42 of the internal combustion engine 4 via the EGR conduit 34. The second EGR valve 44 is suitably of the same type as the first EGR valve 38, although having different valve types are conceivable.

As illustrated in FIG. 2, for the exhaust gas flowing from the first as well as the second sets of cylinders 22, 24, both the first and the second EGR valves 38, 44 may be located upstream of the turbine.

The controller 40 is configured to control the first EGR valve 38 and the second EGR valve 44 so that a desired ratio of recirculated flow of exhaust gas to the EGR conduit 34 relative to the amount of air entering the inlet 42 of the internal combustion engine 4 is obtained. Thus, in a normal operating mode, a balanced recirculation may be provided by opening both EGR valves 38, 44. The controller controls the EGR valves 38, 44 so that the amount of exhaust gas that is recirculated is enough to sufficiently dilute the air/fuel mixture to reduce combustion temperatures to a level that reduces the reaction between nitrogen and oxygen that forms NOx.

It should be noted that as an alternative to, or in addition to, the first and second EGR valves 38, 44, it would be conceivable to (instead of joining the exhaust ducts 26, 30 at a junction 28, 32) connect the EGR conduit 34 to each one of the exhaust ducts 26, 30 and provide an individual EGR valve in each exhaust duct 26, 30 (or in one or more exhaust ducts 26, 30).

The system 20 further comprises a fuel injector 46 for injection of fuel into at least one cylinder of the second set of cylinders 24. Although not illustrated here, any suitable fuel injector may be provided for injecting fuel into the first set of cylinders 22. Furthermore, it should be understood that fuel is injected into each one of the cylinders in the first and second set of cylinders 22, 24, however, not all of them will be for late post injection, which will be discussed in the following. It should also be understood that any suitable number of fuel injectors may be provided for injecting fuel into any one of the cylinders. Furthermore, it should be understood that the fuel injectors may be individually controllable so as to enable different types of injections to each cylinder, if desired.

As explained above, the controller 40 may open or close the second EGR valve 44. In accordance with the inventive concept, the controller 40 is configured to control the closing of the second EGR valve 44, thereby preventing flow of exhaust gas from the second set of cylinders 24 to the EGR conduit 34, and configured to activate the fuel injector 46 for late post injection of fuel into at least one cylinder of the second set of cylinders 24 when the second EGR valve 44 is closed, so that at least a part of the fuel that exits the second set of cylinders 24 is uncombusted. Thus, the late post injection takes place at such a stage that the injected fuel remains uncombusted or at least partly uncombusted when exiting the cylinder. The late post injection may, for instance, occur right before an exhaust valve (not shown) opens so that uncombusted fuel, such as including hydrocarbons, may pass to the EATS 36.

It should be understood that the controller 40 may control one or more fuel injectors for late post injection of fuel into more than one cylinder of the second set of cylinders 24, for instance into two cylinders or into all cylinders (which in the present example would be into three cylinders). The fuel injector 46 may suitably form part of an electronic injection system, which may comprise a small computer or electronic control unit which controls fuel mixture, valve timing, etc. The electronic control unit may collect sensor data such as air pressure, air intake temperature, etc. based on which it operates. Such an electronic control unit may form part of the controller 40 or may receive instructions/input signals from the controller 40.

The EATS 36 is arranged to receive and treat exhaust gas which is not recirculated in the EGR conduit 34. The EATS 36 comprises an oxidation catalyst 48 for combustion of the late post injected fuel or derivates thereof. It should be understood that the EATS 36 may comprise other components as well, even though not illustrated. In other words, the uncombusted fuel, for example including hydrocarbons, or derivates thereof are burnt on the catalyst 48, thereby increasing the temperature. When the controller 40 has closed the second EGR valve 44, all or substantially all exhaust gas from the second set of cylinders 24 flows to the EATS 36.

The oxidation catalyst 48 may suitably be an electrically heated oxidation catalyst. A separate electric heater may be provided for heating the substrate of the catalyst 48, or the catalytic substrate itself may form part of an electric heater. The electric heater may suitably be powered by any energy storage means, such as a traction battery, an auxiliary battery, an accumulator, etc. The controller 40 may be configured to heat the oxidation catalyst 48 to the light-off temperature for hydrocarbons present in the injected fuel.

In operation, when the controller 40 determines that the temperature of the exhaust gas should be increased, the controller 40 starts operating the internal combustion engine system 20 in a temperature-increasing operating mode. In the normal operating mode, both the first EGR valve 38 and the second EGR valve 44 may be opened, however, when switching to the temperature-increasing operating mode, the controller 40 will close the second EGR valve 44, and when the second EGR valve 44 has been closed, the controller will control the fuel injector 46 to late post inject fuel into the one or more cylinders of the second set of cylinders 24, such that uncombusted or at least partly uncombusted fuel exits the second set of cylinders 24 and is transported to the oxidation catalyst 48 where they will burn. By separating the first and second sets of cylinders 22, 24 and allowing the first EGR valve 38 to remain open, an efficient temperature increase is achieved without negatively affecting the recirculation in the EGR conduit 34. Thus, the invention provides for a flexible switching between a balanced normal operating mode and a temperature-increasing operating mode.

Suitably, the flow of recirculated exhaust gas delivered from the EGR conduit 34 to the inlet 42 continues to flow from said inlet 42 to both the first and second sets of cylinders 22, 24. Thus, although the second EGR valve 44 may be closed and late post injection is performed in the second set of cylinders 24, any gas recirculated form the first set of cylinders 22 may suitably be guided through the EGR conduit back to all cylinders 22, 24 (via the inlet 42).

Figure 3A:
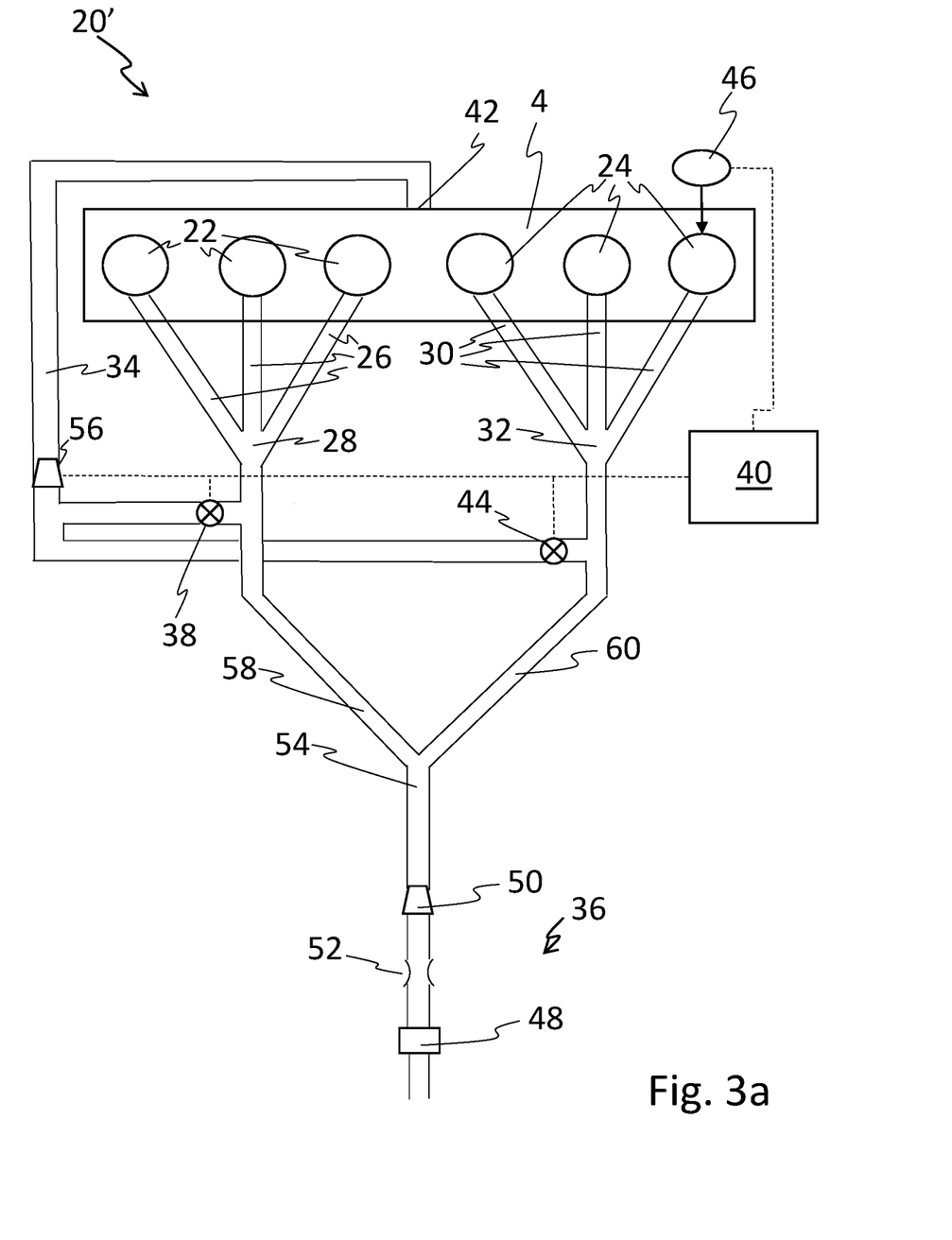
FIGS. 3a and 3b are schematic views illustrating internal combustion engine systems in accordance with at least some other exemplary embodiments of the invention.
Figure 3B:
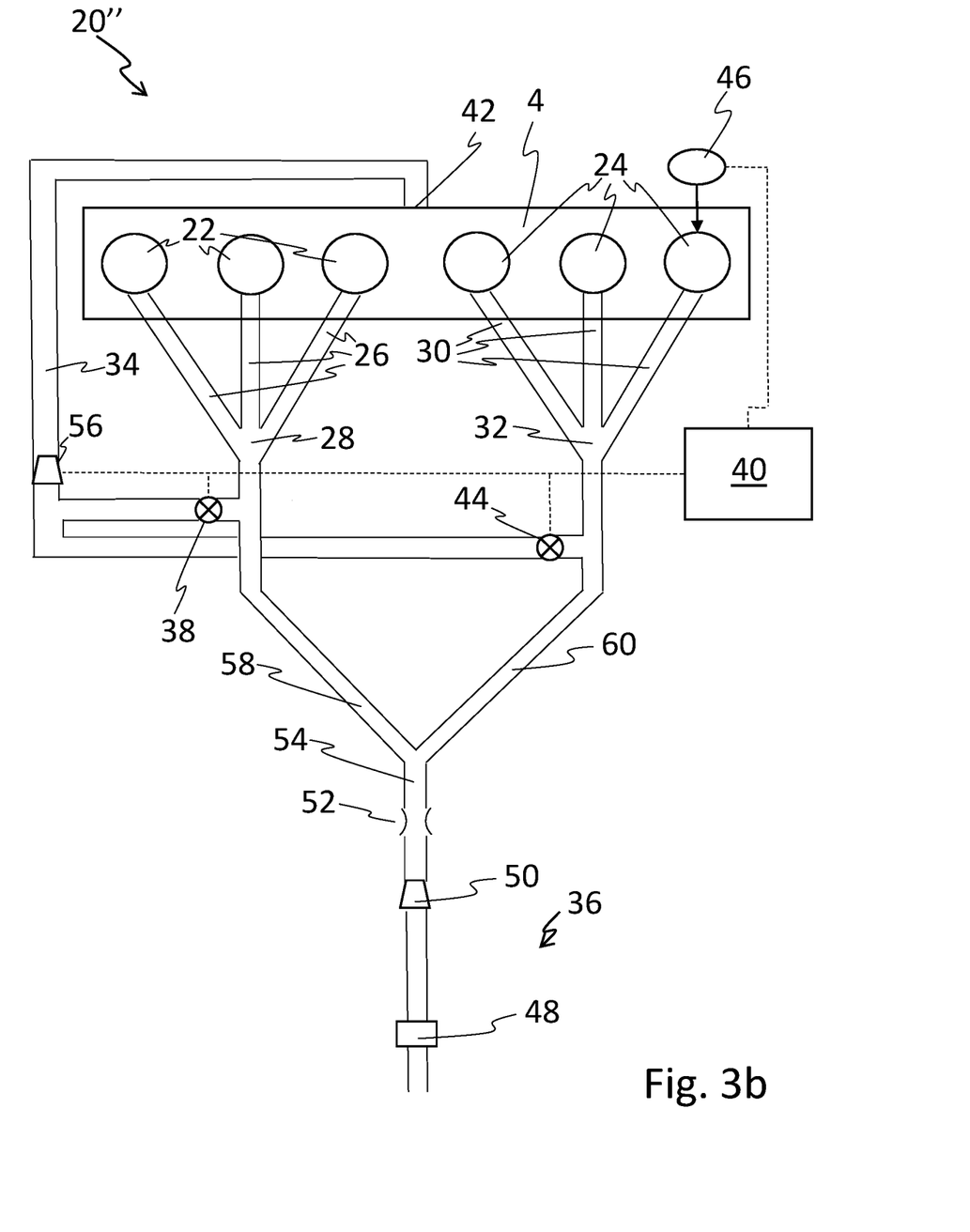

FIGS. 3a and 3b are schematic views illustrating internal combustion engine systems in accordance with at least some other exemplary embodiments of the invention. Components of the internal combustion engine system which correspond to the components already presented in connection with the exemplary embodiment of FIG. 2 are denoted with the same reference numerals.

The internal combustion engine system 20' in FIG. 3a and the internal combustion engine system 20'' in FIG. 3b may, in addition to the components presented in FIG. 2, further comprise an exhaust throttle 52. In FIGS. 3a and 3b, two alternative locations are illustrated for the exhaust throttle 52. In at least some exemplary embodiments, as illustrated in FIG. 3a, the exhaust throttle 52 may be located downstream of the turbine 50 (in FIG. 3a illustrated as located between the turbine 50 and the oxidation catalyst 48). In other exemplary embodiments, as illustrated in FIG. 3b, the exhaust throttle 52 may be provided in an exhaust conduit 54 downstream of the valves 38, 44 and upstream of the turbine 50. In either case, the controller 40 may be configured to control the exhaust throttle 52 for further controlling the flow to the EGR conduit 34. In the second case (FIG. 3b), i.e. the exhaust throttle 52 being provided downstream of the EGR valves 38, 44 and upstream of the turbine 50 the controller 40 may also be used for controlling the exhaust throttle 52 for balancing the flow to the turbine 50. In other exemplary embodiments, it is even conceivable to provide two throttles (not shown) upstream of the turbine 50, one for each EGR valve 38, 44. In such cases, one throttle would be located in a first exhaust branch 58 downstream of the first EGR valve 38, and the other throttle would be located in a second exhaust branch 60 downstream of the second EGR valve 44.

FIGS. 3a and 3b also illustrate that the systems 20' and 20'' may comprise a compressor or pump 56 fluidly connected to the EGR conduit, wherein the controller 40 is configured to control the compressor or pump 56 for controlling the EGR conduit. Thus, the flow in the EGR conduit 34 may be boosted by providing an additional flow control component in the form of a compressor or pump 56 which can drive the EGR flow when the pressure at the intake is higher than the pressure at the exhaust manifold to the EGR conduit 34.

It should be understood that although the drawings illustrate certain combinations of components, these are only exemplary embodiments illustrated for explanatory purposes, and other embodiments are readily conceivable. For instance, the various components (such as pump 56, turbine 50, throttles 52 etc.) illustrated in FIGS. 3*a* and 3*b* can be combined in various ways and it is not necessary to include all features in an embodiment even if they are illustrated in the same drawing. For instance, in some exemplary embodiments, the pump 56 may be included, while the throttle 52 may be omitted. Conversely, in other embodiments, one or more throttles 52 may be included, while the pump 56 is omitted. In other embodiments the throttle 52 as well as the pump 56 may be omitted.

Figure 4:
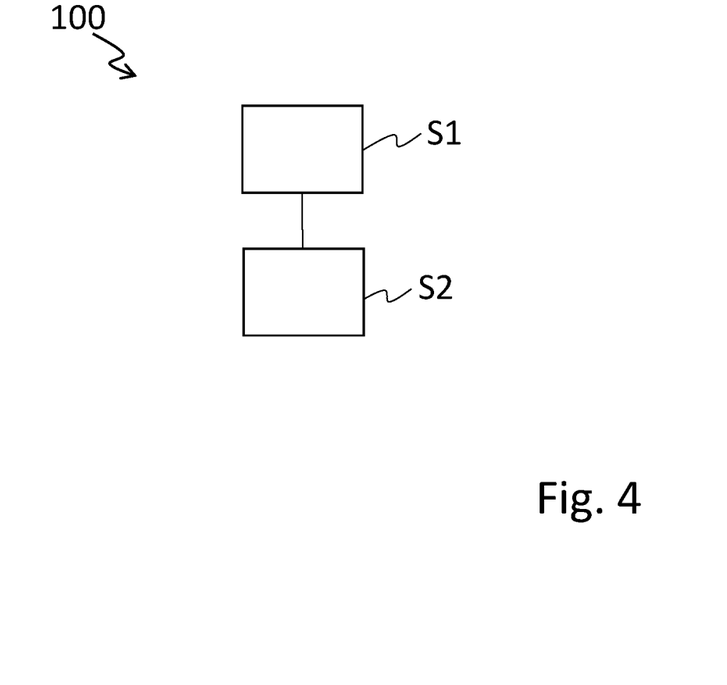
FIG. 4 is a diagram illustrating a method for operating an internal combustion engine system in accordance with the invention.

FIG. 4 is a diagram illustrating a method 100 for operating an internal combustion engine system in accordance with at least one exemplary embodiment of the invention. The internal combustion engine system may, for instance, be in accordance with the one illustrated in FIG. 2, and/or as described elsewhere in this disclosure.

As illustrated in FIG. 4, the method 100 comprises:
in a first step S1, to close the second EGR valve, thereby preventing flow of exhaust gas from the second set of cylinders to the EGR conduit, and
in a second step S2, to activate the fuel injector for late post injection of fuel into at least one cylinder of the second set of cylinders when the second EGR valve is closed, so that at least a part of the fuel that exits the second set of cylinders is uncombusted.

Figure 5:
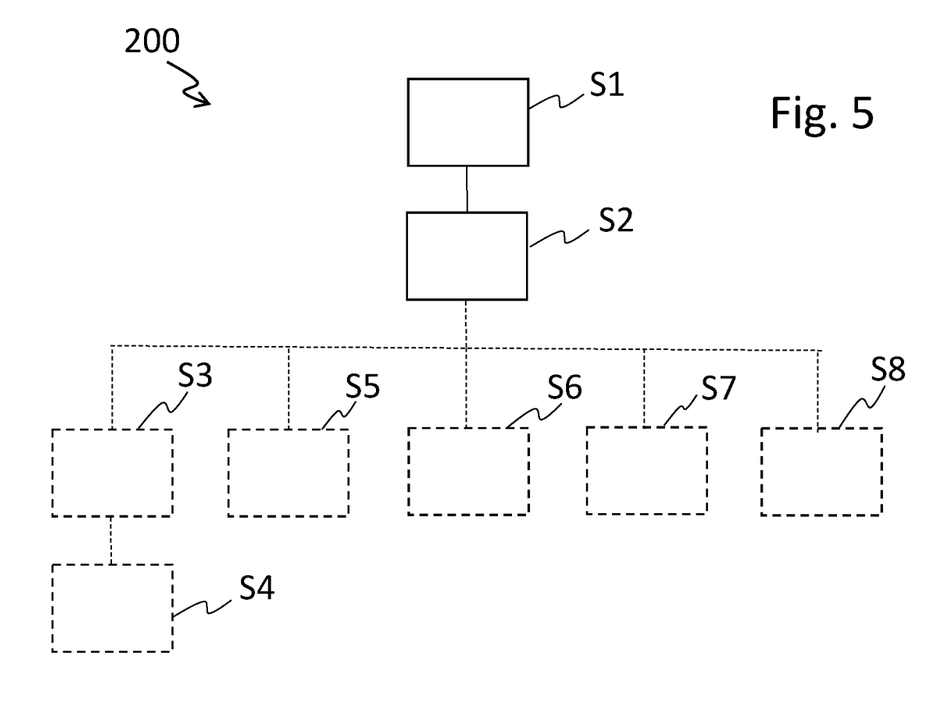
FIG. 5 is a diagram illustrating optional steps which may be implemented in exemplary embodiments of the method for operating an internal combustion engine system.

FIG. 5 is a diagram illustrating optional steps S3-S8, which may be implemented in exemplary embodiments of a method 200 for operating an internal combustion engine system. It should be understood that in some exemplary embodiments several of the optional steps may be performed in combination (either simultaneously or at different points in time), and that in other exemplary embodiments, only one or a few of the optional steps are performed. Accordingly, it should be understood that, although optional steps S3, S5, S6, S7 and S8 have, for simplicity, been illustrated as parallel steps, these optional steps are not mutually exclusive, as will be exemplified further below.

Thus, in addition to the first step S1 and the second step S2, which are the same as in FIG. 4, the following steps may be included in the method 200.

As illustrated in FIG. 5, the method 200 may comprise:
in a third step S3, to determine a desired EGR flow, and
in a fourth step S4, to control the opening of the first EGR valve so that the desired EGR flow is recirculated from the first set of cylinders to the inlet of the internal combustion engine.

It should be noted that although the third step S3 and the fourth step S4 are illustrated as being performed after the second step S2, in other embodiments, the third step S3 and the fourth step S4 may be performed before the first step S1, or between the first step S1 and the second step S2, or simultaneously with either one of steps S1 and S2.

For instance, when in the internal combustion engine is operated in a normal operating mode, both the first EGR valve and the second EGR valve may be opened. When it is determined that the system should be switched to operate in a temperature-increasing operating mode, the first step S1 and the second step S2 may be performed. The third step S3, i.e. determining a desired EGR flow may already have been performed (e.g. by preprograming a control unit, such as the controller 40 in FIG. 2) before switching. Therefore, when the second EGR valve is closed in the first step S1, the first EGR valve may need to be opened to a larger degree for compensating for the loss of EGR flow from the second set of cylinders. Thus, in that case, the fourth step S4 may for instance be performed simultaneously with or just after the first step S1.

FIG. 5 also illustrates an optional fifth step S5, in which the oxidation catalyst is electrically heated to the light-off temperature for hydrocarbons present in the injected fuel. Again, although this is illustrated as being performed after steps S1 and S2, it may be performed at any time in the inventive method. In other words, the fifth step S5 of electrically heating the oxidation catalyst may be performed before, or simultaneously with, either one of steps S1-S4. It should also be noted that in some exemplary embodiments the fifth step S5 may be performed in combination with the third and fourth steps S3-S4 (in any order or simultaneously), while in other exemplary embodiments the fifth step S5 is performed, while the third and fourth steps S3-S4 are omitted.

FIG. 5 also illustrates that the method may comprise, in a sixth step S6, to control the compressor or pump for controlling the flow in the EGR unit. Although this is illustrated as being performed after steps S1 and S2, it may be performed at any time in the inventive method. In other words, the sixth step S6 of electrically heating the oxidation catalyst may be performed before, or simultaneously with, either one of steps S1-S5. Furthermore, it should be noted that in some exemplary embodiments the sixth step S6 may be performed in combination with the third and fourth steps S3-S4 and/or the fifth step S5 (in any order or simultaneously), while in other exemplary embodiments the sixth step S6 is performed, while the third and fourth steps S3-S4 and/or the fifth step S5 is/are omitted.

As discussed in connection with FIGS. 2, 3*a* and 3*b*, in some exemplary embodiments an exhaust throttle may be provided downstream of the turbine, while in other exemplary embodiments an exhaust throttle may instead be provided in an exhaust conduit downstream of the EGR valves and upstream of the turbine. In either one of the alternative embodiments, as illustrated in FIG. 5, the method may comprise, in a seventh step S7, to control the exhaust throttle for further controlling the flow to the EGR conduit.

In the case of the exhaust throttle being provided in an exhaust conduit downstream of the EGR valves and upstream of the turbine, the method may comprise, in an eighth step S8, to control the exhaust throttle for balancing the flow to the turbine.

Although the seventh step S7 and the eighth step S8 are illustrated as being performed after steps S1 and S2, they may be performed at any time in the inventive method. In other words, the seventh step S7 and the eighth step S8 may be performed before, or simultaneously with, either one of steps S1-S6. Furthermore, it should be noted that in some exemplary embodiments seventh step S7 and the eighth step S8 may be performed in combination with the third and fourth steps S3-S4, the fifth step S5 and/or the sixth step S6 (in any order or simultaneously), while in other exemplary embodiments the seventh step S7 and the eighth step S8 may be performed while the third and fourth steps S3-S4, the fifth step S5 and/or the sixth step S6 is/are omitted.

The steps of the method illustrated in FIG. 4 and FIG. 5 may be performed by:
a computer program comprising program code means for performing said steps S1-S2, and optionally said steps S3-S8, when said program is run on a computer,
a computer readable medium carrying a computer program comprising program code means for performing said steps S1-S2, and optionally said steps S3-S8, when said program is run on a computer, and/or
a control unit for controlling the exhaust temperature in an internal combustion engine system, such as the controller 40 illustrated in FIG. 2 or as disclosed in other parts of the present disclosure, the control unit being configured to perform said steps S1-S2, and optionally said steps S3-S8.

Figure 6:
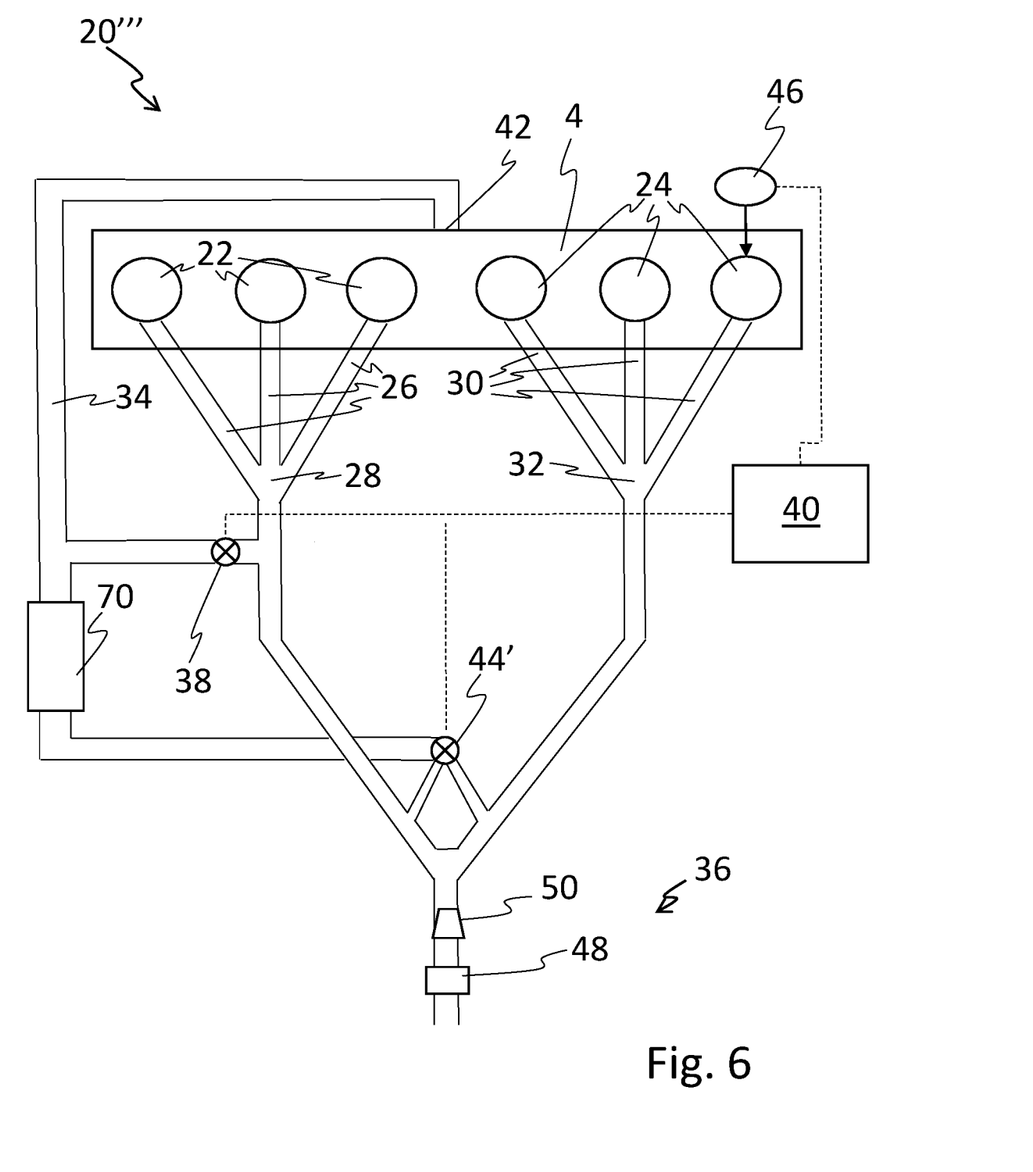
FIG. 6 is a schematic view illustrating an internal combustion engine system in accordance with at least some further exemplary embodiments of the invention.

FIG. 6 is a schematic view illustrating an internal combustion engine system 20''' in accordance with at least some further exemplary embodiments of the invention. Components of the internal combustion engine system 20''' of FIG. 6 which correspond to the components already presented in connection with the exemplary embodiment of FIG. 2 are denoted with the same reference numerals.

Thus, similarly to the internal combustion engine system 20 of FIG. 2, in the internal combustion engine system 20''' of FIG. 6 the first EGR valve 38 is provided for controlling the flow of exhaust gas from the first set of cylinders 22 to the EGR conduit.

Similarly to the internal combustion engine system 20 of FIG. 2, in the internal combustion engine system 20''' of FIG. 6, exhaust gas from the second set of cylinders 24 may be led to the EATS 36 and/or the EGR conduit 34. A second EGR valve 44', which is controllable by the controller 40 to either close the second EGR valve 44', in which case substantially all exhaust gas from the second set of cylinders 24 passes through the turbine 50 to the EATS 36, or to open the second EGR valve 44' to bleed off exhaust gas for recirculation to the inlet 42 of the internal combustion engine 4 via the EGR conduit 34. The second EGR valve 44' may suitably be of the same or similar type as the first EGR valve 38, although having different valve types are conceivable.

Unlike the second EGR valve 44 in FIG. 2, which is only provided for controlling exhaust gas from the second set of cylinders 24, in FIG. 6 the second EGR valve 44' is provided for controlling the exhaust gases from both the first set of cylinders 22 and the second set of cylinders 24. In other words, the controller 40 may control the recirculation of exhaust gases from the first set of cylinders 22 by controlling the first EGR valve 38 and/or the second EGR valve 44'.

It should be understood that although only an oxidation catalyst 48 has been shown in the figures, the EATS 36 in each figure may suitably include other components as well, such as those disclosed elsewhere in this application. For example, the EATS 36 may include a particulate filter catching soot and ashes, and a reduction catalysts reducing nitrogen oxides to nitrogen, such as with the help of a reductant fluid. Furthermore, the internal combustion engine system 20''' in FIG. 6 may in at least some exemplary embodiments comprise an exhaust throttle, such as shown in FIGS. 3*a*-3*b*.

It should be understood that each one of the discussed and illustrated exemplary embodiments may be provided with an EGR cooler, although not explicitly shown in all the figures. In FIG. 6, however, an EGR cooler 70 is explicitly illustrated. In the illustrated exemplary embodiment, the exhaust gas which passes through the second EGR valve 44' reaches the EGR conduit 34 upstream of the EGR cooler 70. Exhaust gas which passes through the first EGR valve 38 is, however, in this exemplary embodiment illustrated as reaching the EGR conduit 34 downstream of the EGR cooler 70. Thus, an EGR cooler bypass is configured via the first EGR valve 38, whereby it is possible to control the amount of recirculated gases that should not be cooled. The non-cooled gas provides hotter inlet gas to the cylinders, which in turn results in hotter exhaust gas at cold start.

The controller 40 may suitably control each EGR valve 38, 44' individually. For instance, when hotter gases are not needed, the controller may close the first EGR valve 38, and let the exhaust gases from the first and second sets of cylinders 22, 24 be recirculated via the second EGR valve 44'. When late post injection is to be performed, then the controller 40 closes the second EGR valve 44', and may optionally open the first EGR valve 38 depending on the current circumstances.

It should be noted that in other exemplary embodiments the exhaust gas which passes the first EGR valve 38 may instead be arranged to reach the EGR conduit 34 upstream of the EGR cooler 70.

It is to be understood that the present invention is not limited to the embodiments described above and illustrated in the drawings; rather, the skilled person will recognize that many changes and modifications may be made within the scope of the appended claims.

The invention claimed is:

1. An internal combustion engine system, comprising:
an internal combustion engine comprising a first set of one or more cylinders and a second set of one or more cylinders which is separate from the first set,
an exhaust gas recirculation (EGR) conduit for recirculating exhaust gas from the first and second sets of cylinders to an inlet of the internal combustion engine,
an EGR cooler provided in the EGR conduit,
a first EGR valve for controlling flow of exhaust gas from the first set of cylinders to the EGR conduit, the first EGR valve fluidly connected to the EGR conduit downstream of the EGR cooler
a fuel injector for injection of fuel into at least one cylinder of the second set of cylinders,
a second EGR valve for controlling flow of exhaust gas from the second set of cylinders to the EGR conduit,
a controller configured to control the closing of the second EGR valve, thereby preventing flow of exhaust gas from the second set of cylinders to the EGR conduit, and configured to activate the fuel injector for late post injection of fuel into at least one cylinder of the second set of cylinders when the second EGR valve is closed, so that at least a part of the fuel that exits the second set of cylinders is uncombusted,
a turbine arranged to receive and be driven by exhaust gas which is not recirculated in the EGR conduit, and
an exhaust gas aftertreatment system arranged to receive and treat exhaust gas which is not recirculated in the EGR conduit, the exhaust gas aftertreatment system comprising an oxidation catalyst for combustion of the late post injected fuel or derivates thereof,
wherein, for the exhaust gas flowing from the second set of cylinders, the second EGR valve is located upstream of the turbine, and
wherein the second EGR valve additionally configured to control flow of exhaust gas from the first set of cylinders to the EGR conduit.

2. The internal combustion engine system according to claim 1, wherein the controller is configured to determine a desired EGR flow and to control the opening of the first EGR valve so that the desired EGR flow is recirculated from the first set of cylinders to the inlet of the internal combustion engine.

3. The internal combustion engine system according to claim 1, wherein the flow of recirculated exhaust gas delivered from the EGR conduit to said inlet continues to flow from said inlet to both the first and second sets of cylinders.

4. The internal combustion engine system according to claim 1, wherein the controller is configured to control the first and second EGR valves so that a desired ratio of recirculated flow of exhaust gas to the EGR conduit relative to the amount of air entering the inlet of the internal combustion engine is obtained.

5. The internal combustion engine system according to claim 1, wherein when the second EGR valve is closed all exhaust gas from the second set of cylinders flows to the exhaust gas aftertreatment system.

6. The internal combustion engine system according to claim 1, wherein the oxidation catalyst is an electrically heated oxidation catalyst.

7. The internal combustion engine system according to claim 6, wherein the controller is configured to heat the oxidation catalyst to the light-off temperature for hydrocarbons present in the injected fuel.

8. The internal combustion engine system according to claim 1, comprising an exhaust throttle, wherein
the exhaust throttle is provided downstream of the turbine, or
the exhaust throttle is provided in an exhaust conduit downstream of the first and second EGR valves and upstream of the turbine,
wherein the controller is configured to control the exhaust throttle for further controlling the flow to the EGR conduit.

9. The internal combustion engine system according to claim 1, comprising a compressor or pump fluidly connected to the EGR conduit, wherein the controller is configured to control the compressor or pump for controlling the flow in the EGR conduit.

10. A vehicle comprising an internal combustion engine system according to claim 1.

11. A method of operating an internal combustion engine system which comprises:
an internal combustion engine comprising a first set of one or more cylinders and a second set of one or more cylinders which is separate from the first set,
an exhaust gas recirculation (EGR) conduit for recirculating exhaust gas from the first and second sets of cylinders to an inlet of the internal combustion engine,
an EGR cooler provided in the EGR conduit,
a first EGR valve for controlling flow of exhaust gas from the first set of cylinders to the EGR conduit, the first EGR valve fluidly connected to the EGR conduit downstream of the EGR cooler,
a second EGR valve for controlling flow of exhaust gas from the second set of cylinders to the EGR conduit,
a fuel injector for injection of fuel into at least one cylinder of the second set of cylinders,
a turbine arranged to receive and be driven by exhaust gas which is not recirculated in the EGR conduit, and
an exhaust gas aftertreatment system arranged to receive and treat exhaust gas which is not recirculated in the EGR conduit, the exhaust gas aftertreatment system comprising an oxidation catalyst for combustion of fuel and/or fuel derivates,
wherein, for the exhaust gas flowing from the second set of cylinders, the second EGR valve is located upstream of the turbine, and
wherein the second EGR valve additionally configured to control flow of exhaust gas from the first set of cylinders to the EGR conduit,
the method comprising :
closing the second EGR valve, thereby preventing flow of exhaust gas from the second set of cylinders to the EGR conduit without preventing flow of exhaust gas to the exhaust gas aftertreatment system, and
activating the fuel injector for late post injection of fuel into at least one cylinder of the second set of cylinders when the second EGR valve is closed, so that at least a part of the fuel that exits the second set of cylinders is uncombusted.

12. The method according to claim 11, further comprising the:
determining a desired EGR flow, and
controlling the opening of the first EGR valve so that the desired EGR flow is recirculated from the first set of cylinders to the inlet of the internal combustion engine.

13. The method according to claim 11, wherein the exhaust gas aftertreatment system comprises an electrically heated oxidation catalyst, wherein the method further comprises :
electrically heating the oxidation catalyst to the light-off temperature for hydrocarbons present in the injected fuel.

14. The method according to claim 11, wherein the internal combustion engine system comprises an exhaust throttle provided downstream of the turbine, the method further comprises :
controlling the exhaust throttle for further controlling the flow to the EGR conduit.

15. The method according to claim 11, wherein the internal combustion engine system comprises an exhaust throttle provided in an exhaust conduit downstream of the first and second EGR valves and upstream of the turbine, the method further comprising :
controlling the exhaust throttle for balancing the flow to the turbine, and/or
controlling the exhaust throttle for further controlling the flow to the EGR conduit.

16. The method according to claim 11, wherein the internal combustion engine system comprises a compressor or pump fluidly connected to the EGR conduit, the method further comprising :
controlling the compressor or pump for controlling the flow in the EGR conduit.

17. A computer program comprising program code for performing the method of claim 11 when said program is run on a computer.

18. A computer readable medium carrying a computer program comprising program code for performing the method of claim 11 when said program is run on a computer.

19. A control unit for controlling the exhaust temperature in an internal combustion engine system, the control unit being configured to perform the method according to claim 11.

* * * * *